United States Patent
Kobayashi

(10) Patent No.: US 6,633,759 B1
(45) Date of Patent: Oct. 14, 2003

(54) COMMUNICATION SYSTEM, AND MOBILE COMMUNICATION DEVICE, PORTABLE INFORMATION PROCESSING DEVICE, AND DATA COMMUNICATION METHOD USED IN THE SYSTEM

(75) Inventor: Koichi Kobayashi, Tachikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 267 days.

(21) Appl. No.: 09/653,949

(22) Filed: Sep. 1, 2000

(30) Foreign Application Priority Data

Sep. 30, 1999 (JP) .......................................... 11-280495

(51) Int. Cl.$^7$ ................................................ H04Q 7/20
(52) U.S. Cl. ........................ 455/419; 455/418; 455/566; 455/557
(58) Field of Search ................................ 455/556, 557, 455/575, 567, 558, 566, 414, 418, 419, 420, 11.1

(56) References Cited

U.S. PATENT DOCUMENTS

| | | | | |
|---|---|---|---|---|
| 5,142,563 A | * | 8/1992 | Nyuu et al. ................... | 455/573 |
| 5,678,229 A | * | 10/1997 | Seki et al. .................... | 455/343 |
| 5,901,361 A | * | 5/1999 | Luong ......................... | 455/517 |
| 5,926,756 A | * | 7/1999 | Piosenka et al. ............. | 455/418 |
| 5,949,777 A | * | 9/1999 | Uyesugi et al. .............. | 370/345 |
| 5,983,073 A | * | 11/1999 | Ditzik ......................... | 455/11.1 |
| 6,023,620 A | * | 2/2000 | Hansson ...................... | 455/419 |
| 6,138,009 A | * | 10/2000 | Birgerson .................... | 455/419 |
| 6,230,214 B1 | * | 5/2001 | Liukkonen et al. ............ | 710/1 |
| 6,263,218 B1 | * | 7/2001 | Kita ............................ | 455/567 |
| 6,405,027 B1 | * | 6/2002 | Bell ............................ | 455/403 |
| 2001/0041943 A1 | * | 11/2001 | Tang et al. ................... | 700/2 |
| 2002/0057810 A1 | * | 5/2002 | Boesen ........................ | 381/151 |

FOREIGN PATENT DOCUMENTS

| | | |
|---|---|---|
| CH | WO 98/58510 | * 12/1998 |
| JP | 10-56673 | 2/1998 |

OTHER PUBLICATIONS

NIKKEI Electronics 1999.12.13, No. 759, pp. 139–163, (1999).
Interface Feb. 2000, pp. 112–117, (2000).

* cited by examiner

*Primary Examiner*—Thanh Cong Le
*Assistant Examiner*—Tan Trinh
(74) *Attorney, Agent, or Firm*—Finnegan, Henderson, Farabow, Garrett & Dunner, L.L.P.

(57) ABSTRACT

A mobile communication device includes a unit for establishing a wireless link for a wireless communication with an external device, a unit for, via the wireless link, sending a signal to the external device to start software installed therein, a unit for, via the wireless link, receiving display data generated by software from the external device, and a unit for displaying on a screen the display data received.

21 Claims, 9 Drawing Sheets

COMMUNICATION SYSTEM, AND MOBILE COMMUNICATION DEVICE, PORTABLE INFORMATION PROCESSING DEVICE, AND DATA COMMUNICATION METHOD USED IN THE SYSTEM

CROSS-REFERENCE TO RELATED APPLICATIONS

This application is based upon and claims the benefit of priority from the prior Japanese Patent Application No. 11-280495, filed Sep. 30, 1999, the entire contents of which are incorporated herein by reference.

BACKGROUND OF THE INVENTION

The present invention relates to a communication system employing an information processing device such as a personal computer and a mobile communication device such as a cellular phone, and more particularly to a communication system for allowing a mutual data communication between these devices via a wireless communication, and a mobile communication device, an information processing device, and a data communication method used in the communication system.

With the recent spread of cellular phones, a communication system that allows a data communication by connecting a cellular phone to a personal computer (hereinafter, abbreviated to PC) has been proposed.

For example, Jpn. Pat. Appln. KOKAI Publication No. 10-56673 discloses a wireless communication device and an information processing device, wherein an interface between a cellular phone and a PC is constructed by an infrared communication. More specifically, when a cellular phone is connected to a public line via a wireless communication system to transmit/receive data to/from a separate information processing device, a data communication is allowed by connecting the cellular phone to the PC via an interface which is constructed not by a cable connection but an infrared communication. This publication also discloses that the cellular phone controls the ON/OFF action of the PC's main power source.

Thus, a data communication by connecting the cellular phone to the PC has been known. However, in such a data communication, the cellular phone is used merely as communication means. Hence, for example, data can not be downloaded from each other to enable the user to see data on desired software installed in the PC on the display screen of the cellular phone by downloading the data from the PC to the cellular phone by manipulating the cellular phone, or conversely, to see a display content on the cellular phone on the display screen of the PC by downloading corresponding data from the cellular phone to the PC by manipulating the PC.

The cellular phone of the above publication merely controls the ON/OFF action of the PC's main power, and bi-directional data transmission, that is, sending the data in the cellular phone to the PC and sending the data in the PC to the cellular phone, has not been implemented.

Constructing the interface between the cellular phone and PC by an infrared communication as disclosed in the above publication can offer an advantage that connection cables are omitted. However, because infrared rays travel straight, even a slight angle shift with respect to each other can cut the communication therebetween. Moreover, if an obstacle stands in the way between the sender and receiver devices, the communication is totally impossible. These drawbacks raise a problem in reliability of the communication.

Further, infrared rays can travel over only a limited distance, and according to the IrDA (Infrared Data Association) standards, a communication is allowed within an area of a radius of one meter (optionally extendable up to three meters). Hence, the infrared communication is available on condition that the cellular phone and PC are physically close to each other, and a remote manipulation with respect to each other is impossible when the two devices are too remote.

BRIEF SUMMARY OF THE INVENTION

Accordingly, it is an object of the present invention to provide a communication system, wherein software installed in one device is remotely manipulated by the other, so that display data generated by starting the software can be displayed on the other device, and a mobile communication device, an information processing device, and a data communication method used in the communication system.

According to one aspect of the present invention, there is provided a mobile communication device comprising: means for establishing a wireless link for a wireless communication with an external device; means for, via the wireless link, sending a signal to the external device to start software installed therein; means for, via the wireless link, receiving display data generated by software from the external device; and means for displaying on a screen the display data received.

According to another aspect of the present invention, there is provided a portable information processing device comprising: means for establishing a wireless link for a wireless communication with a mobile communication device; means for, via the wireless link, sending a signal to the mobile communication device to start software installed therein; means for, via the wireless link, receiving display data generated by software from the mobile communication device; and means for displaying on a screen the display data received.

According to still another aspect of the present invention, there is provided a communication system having a mobile communication device and a portable information processing device comprising: means, provided in the mobile communication device and portable information processing device, for establishing a wireless link for a wireless communication between the mobile communication device and portable information processing device; means, provided in the mobile communication device, for sending a signal to the portable information processing device via the wireless link to start software installed therein; means, provided in the portable information processing device, for sending display data generated by software installed in the portable information processing device to the mobile communication device via the wireless link in response the signal; and means, provided in the mobile communication device, for displaying the display data sent from the portable information processing device on a screen of the mobile communication device.

According to still another aspect of the present invention, there is provided a data communication method for use in a communication system having a mobile communication device and a portable information processing device, comprising the steps of: establishing a wireless link for a wireless communication between the mobile communication device and portable information processing device; sending a signal to the portable information processing device from the mobile communication device via the wireless link to start software installed in the portable information processing device; sending display data generated by software installed in the portable information processing device to the mobile communication device from the portable information processing device via the wireless link in response to the signal; and displaying the display data sent from the portable information processing device to the mobile communication device on a screen of the mobile communication device.

According to still another aspect of the present invention, there is provided a portable information processing device comprising: means for setting a wireless link with an external device; means for, via the wireless link, sending a command to the external device; and means for, via the wireless link, receiving data corresponding to the command from the external device, the data including battery information of the external device.

According to still another aspect of the present invention, there is provided a portable information processing device comprising: means for setting a first wireless link with a cellular phone which is connectable to a public line via a second wireless link; means for, via the first wireless link, sending a command to the cellular phone; and means for, via the first wireless link, receiving data corresponding to the command from the cellular phone, the data including electric field intensity information for the second wireless link.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

There will be detailed below the preferred embodiment of the present invention with reference to the accompanying drawings.

Figure 1:
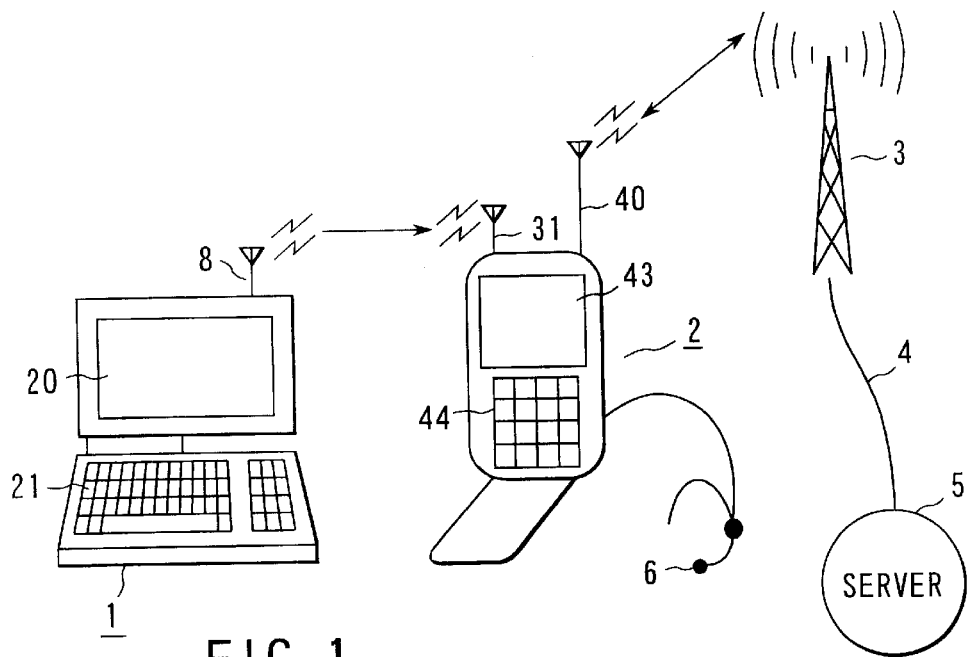
FIG. 1 is a view depicting an arrangement of a communication system in accordance with one embodiment of the present invention.

FIG. 1 is a view depicting an arrangement of a communication system in accordance with one embodiment of the present invention. The communication system of the present embodiment employs a personal computer (hereinafter, abbreviated to PC) 1 as an information processing device and a cellular phone 2 as an mobile communication device, which are connected to each other via a wireless communication by a radio wave in a particular frequency bandwidth, thereby implementing a bi-directional data communication function such that data on desired software installed in the PC 1 is sent to the cellular phone 2 by a manipulation made on the cellular phone 2 to be displayed on the screen thereof, or data on desired software installed in the cellular phone 2 is sent to the PC 1 by a manipulation made on the PC 1 to be displayed on the screen thereof.

The software referred to herein includes, in case of the PC 1, application software installed in the PC 1, such as word processing software, and in case of the cellular phone 2, application software installed in the cellular phone 2, such as e-mail software.

The cellular phone 2 transmits/receives sound or data to/from any local cellular phone station 3 by a wireless radio wave in 800 MHz, for example. The cellular phone station 3 constructs a predetermined wireless area, and allows a communication with the cellular phone 2 within the wireless area. The cellular phone station 3 is connected to a server 5 serving as another information processing device via a public network 4. In addition, the cellular phone 2 can be used with a headset 6 when making a communication.

Although it will be described below, the cellular phone 2 is provided with an antenna unit 31 for transmitting/receiving a wireless radio wave in 2.45 GHz to/from the PC 1, an antenna unit 40 for transmitting/receiving a wireless radio wave in 800 MHz to/from the cellular phone station 3, an LCD 43 for displaying data thereon, a key manipulation unit 44 for inputting data, etc. (see FIG. 4).

On the other hand, the PC 1 and cellular phone 2 are connected to each other by a wireless radio wave in a particular frequency bandwidth, which is different from a wireless radio wave used in the cellular phone system. More specifically, a wireless LAN (Local Area Network) or the Bluetooth system in 2.45 GHz is used. The Bluetooth system is a wireless communication system in conformance with the short-range wireless communication standards, which implements a wireless communication within an area of a radius of ten meters by a radio wave in 2.45 GHz.

Although it will be described below, the PC 1 is provided with an antenna unit 8 for transmitting/ receiving a wireless radio wave in 2.45 GHz to/from the cellular phone 2, an LCD 20 for displaying data thereon, a keyboard 21 for inputting data, etc. (see FIG. 2).

Also, although it will be described below, besides the pre-installed software in a general PC, such as word processing software, spreadsheet software, and e-mail software, the PC 1 is furnished with a communication function that implements the present system (see FIG. 3). The same can be said with the cellular phone 2. That is, besides the functions furnished in a general cellular phone, such as a function to enable the user to look through service information provided from the server 5, an electric field intensity detecting function, and a battery checking function, the cellular phone 2 is furnished with a communication function that implements the present system (see FIG. 5).

The following description will describe the arrangements of the PC 1 and cellular phone 2 in terms of a hardware arrangement and a software arrangement.

Arrangement of PC 1

Figure 2:
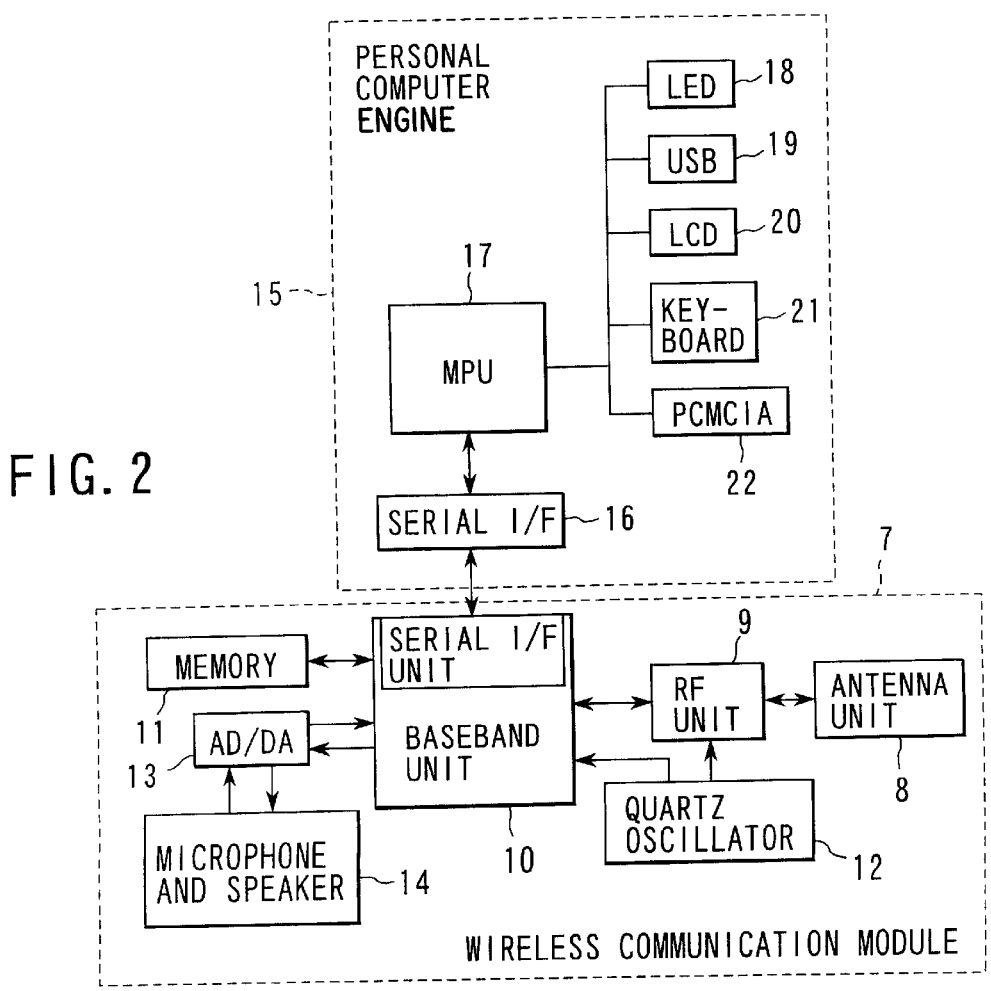
FIG. 2 is a block diagram depicting a hardware arrangement of a personal computer (PC) employed in the communication system.

FIG. 2 is a block diagram depicting a hardware arrangement of the PC 1. The explanation is given mostly on a hardware portion necessary to implement the present system.

The PC 1 is provided with a wireless communication module 7 that allows a communication with the cellular phone 2 by a wireless radio wave in 2.45 GHz. The wireless communication module 7 includes the antenna unit 8, an RF (Radio Frequency) unit 9, a baseband unit 10, a memory 11, a quartz oscillator 12, an AD/DA converting unit 13, and a microphone and speaker unit 14. A similar wireless module is provided in the cellular phone 2 (see FIG. 4). The wireless communication module 7 is connected to a personal computer engine 15 via a serial I/F 16 of the RS-232C standards, for example.

The antenna unit 8 is a unit that transmits/receives a wireless radio wave in 2.45 GHz, by which a wireless communication with the cellular phone 2 is implemented. In receiving data, the RF unit 9 removes unwanted signal components from the wireless radio wave received by the antenna unit 8, converts the received signal to a signal in the medium frequency bandwidth by mixing the same with a local signal outputted from the quartz oscillator 12, and de-modulates the medium-frequency signal to a digital signal so as to be handled by the baseband unit 10. The baseband unit 10 encloses a CPU and implements a protocol. A signal inputted into the baseband unit 10 through the antenna unit 8 and RF unit 9 is converted therein to a data row so as to be processed by the CPU.

In transmitting data, the procedure is inverse to the procedure when receiving data. That is, after the baseband unit 10 modulates a transmission signal to a wireless radio wave so as to be handled by the RF unit 9 in accordance with a predetermined protocol, the wireless radio wave is changed to a wireless radio wave in 2.45 GHz by the RF unit 9, and radiated out into air from the antenna unit 8. The quartz oscillator 12 can output two kinds of signals: one for the RF unit 9 and the other for the CPU enclosed in the baseband unit 10.

The microphone and speaker unit 14 is a device that inputs and outputs a sound signal (equivalent to a transmitter and a receiver), and connected to the baseband unit 10 through the AD/DA converting unit 13.

On the other hand, the personal computer engine 15 is provided with an MPU 17 having a CPU, a memory, a peripheral control circuit, etc., an LED (Light Emitting Diode) 18 for displaying a warning or the like, a USB (Universal Serial Bus) interface 19 for connecting peripheral devices of the USB standards, an LCD (Liquid Crystal Display) 20 for displaying data thereon, a keyboard 21 for inputting data, a PCMCIA (Personal Computer Memory Card International Association) interface 22 for incorporating a PC card, etc.

Figure 3:
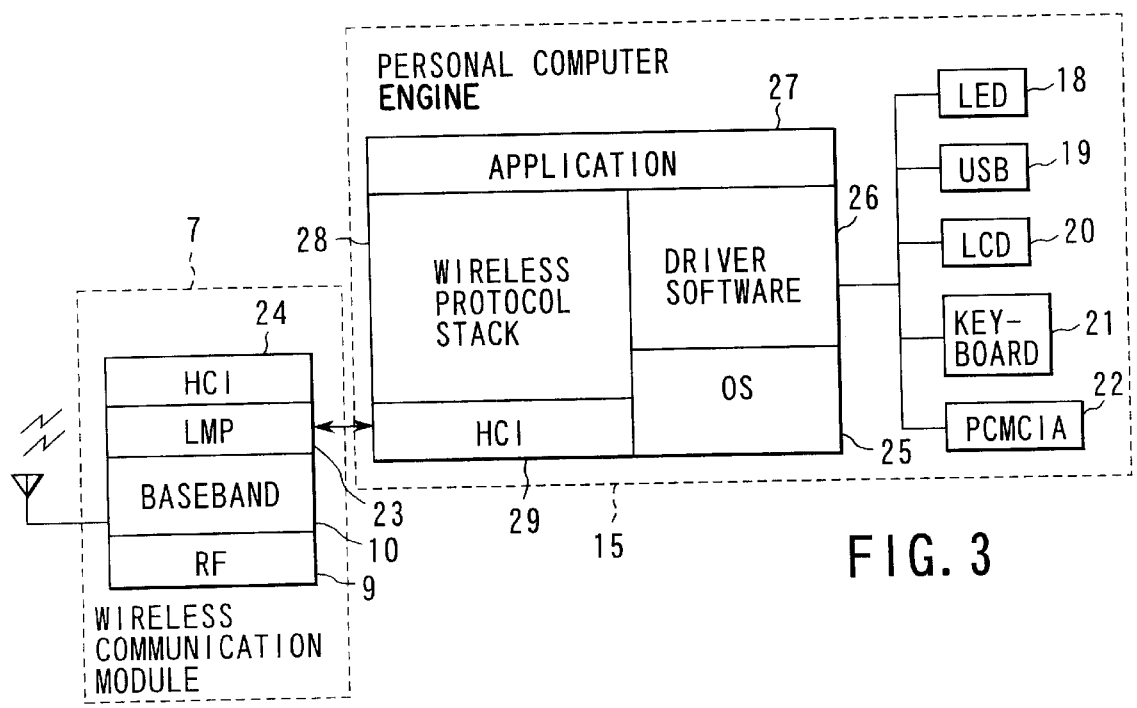
FIG. 3 is a block diagram depicting a software arrangement of the PC.

FIG. 3 is a block diagram depicting a software arrangement of the PC 1. FIG. 3 shows an arrangement in a case where a wireless protocol stack for a wireless communication in 2.45 GHz is provided in the personal computer engine 15.

As shown in FIG. 3, the wireless communication module 7 of the PC 1 includes the RF unit 9 and baseband unit 10 as the hardware, and an LMP (Link Management Protocol) 23 for controlling a wireless link with a wireless communication device in the cellular phone 2 by a wireless radio wave, and an HCI (Host Control Interface) 24 for conducting serial interface processing with the personal computer engine 15 are provided on the baseband unit 10.

In addition, besides an OS (Operating System) 25, driver software 26 for controlling peripheral devices, software 27 including word processing software, spreadsheet software, e-mail software, etc. preinstalled in a general PC, the personal computer engine 15 is provided with a wireless protocol stack 28 for a wireless communication in 2.45 GHz and an HCI 29 for conducting serial interface processing with the wireless communication module 7 to implement the present system.

Arrangement of Cellular Phone 2

Figure 4:
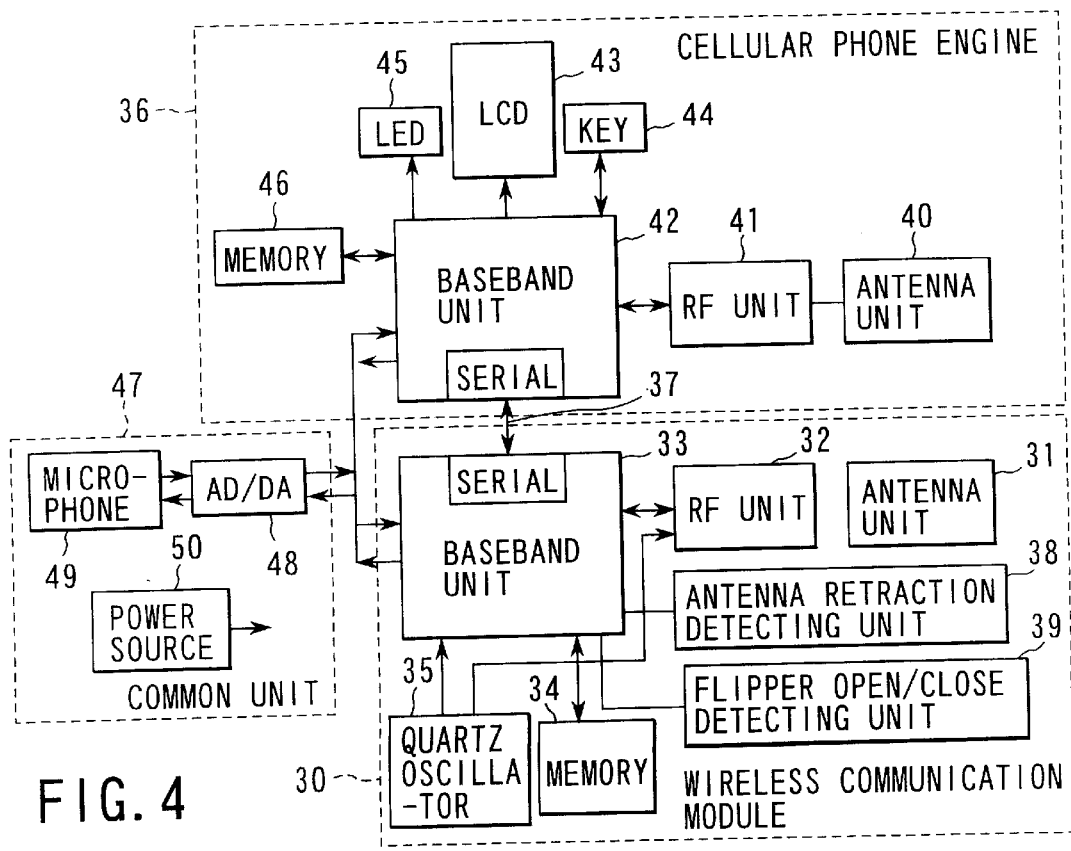
FIG. 4 is a block diagram depicting a hardware arrangement of a cellular phone used in the communication system.

FIG. 4 is a block diagram depicting a hardware arrangement of the cellular phone 2. The explanation is given mostly on a hardware portion necessary to implement the present system.

The cellular phone 2 is provided with a wireless communication module 30 that allows a communication with the PC 1 by a wireless radio wave in 2.45 GHz. The wireless communication module 30 includes the antenna unit 31, an RF unit 32, a baseband unit 33, a memory 34, and a quartz oscillator 35. The wireless communication module 30 is connected to a cellular phone engine 36 via a serial I/F 37 of the RS-232C standards, for example.

The antenna unit 31 is a unit that transmits/receives a wireless radio wave in 2.45 GHz to/from the PC 1, by which a wireless communication with the PC 1 is implemented. In receiving data, the RF unit 32 removes unwanted signal components from the wireless radio wave received by the antenna unit 31, converts the received signal to a signal in the medium frequency bandwidth by mixing the same with a local signal outputted from the quartz oscillator 35, and de-modulates the medium-frequency signal to a digital signal so as to be handled by the baseband unit 33. The baseband unit 33 encloses a CPU and implements a protocol. A signal inputted into the baseband unit 33 through the antenna unit 31 and RF unit 32 is converted therein to a data row so as to be processed by the CPU.

In transmitting data, the procedure is inverse to the procedure when receiving data. That is, after the baseband unit 33 modulates a transmission signal to a wireless radio wave so as to be handled by the RF unit 32 in accordance with a predetermined protocol, the wireless radio wave is changed to a wireless radio wave in 2.45 GHz by the RF unit 32, and radiated out into air from the antenna unit 31. The quartz oscillator 35 can output two kinds of signals: one for the RF unit 32 and the other for the CPU enclosed in the baseband unit 33.

The wireless communication module 30 is provided with an antenna retraction detecting unit 38 for detecting an antenna retraction state and a flipper open/close detecting unit 39 for detecting a flipper open/close state. Both the antenna retraction detecting unit 38 and flipper open/close detecting unit 39 are connected to the baseband unit 33, so that the baseband unit 33 receives detection signals from these detecting units 38 and 39 to acknowledge the antenna retraction state and flipper close/open state, and runs a job in response to the acknowledged state. A concrete detecting method of the antenna retraction state and flipper open/close state will be explained below with reference to FIGS. 6A and 6B.

On the other hand, besides the cellular phone antenna 40, an RF unit 41, and a baseband unit 42, the cellular phone engine 36 is provided with an LCD 43 for displaying data thereon, a key manipulation unit 44 for inputting data, an LED 45 for displaying a warning or the like, a memory 46 for storing data, etc.

Also, an AD/DA converting unit 48, a microphone and speaker 49, and a power source 50 are provided as a common unit 47.

Figure 5:
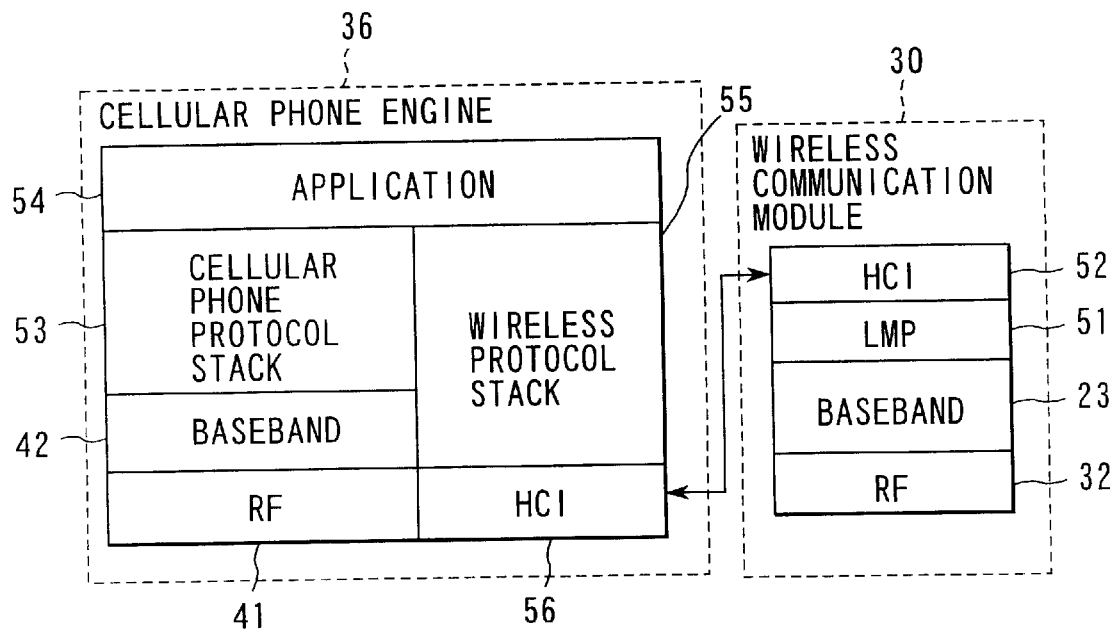
FIG. 5 is a block diagram depicting a software arrangement of the cellular phone.

FIG. 5 is a block diagram depicting a software arrangement of the cellular phone 2. FIG. 5 shows an arrangement in a case where a wireless protocol stack for a wireless communication in 2.45 GHz is provided in the cellular phone engine 36.

As shown in FIG. 5, the wireless communication module 30 of the cellular phone 2 includes the RF unit 32 and baseband unit 33 as hardware, and an LMP (Link Management Protocol) 51 for controlling a wireless link with a wireless communication device in the PC 1 by a wireless radio wave, and an HCI (Host Control Interface) 52 for conducting serial interface processing with the cellular phone engine 36 are provided on the baseband unit 33.

In addition, besides the RF unit 41, the baseband unit 42, a cellular phone protocol stack 53, an application 54 generally pre-installed in a cellular phone, the cellular phone engine 36 is provided with a wireless protocol stack 55 for a wireless communication in 2.45 GHz and an HCI 56 for conducting serial interface processing with the wireless communication module 30 that implement the present system.

Figures 6A, 6B:
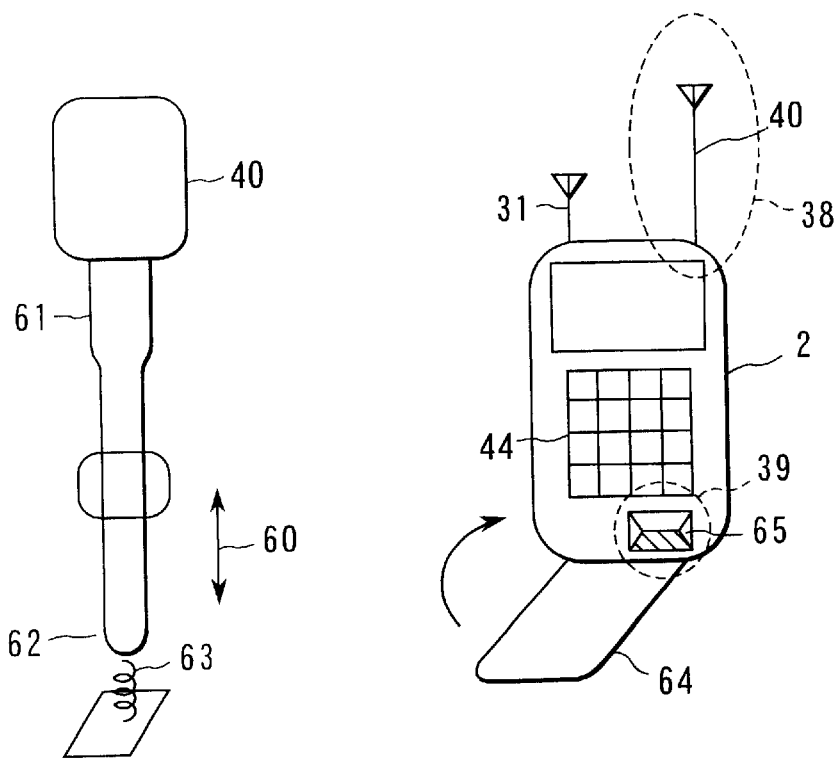
FIGS. 6A and 6B are views explaining a detecting method of an antenna retraction state by an antenna retraction detecting unit and a detecting method of a flipper open/close state by a flipper open/close detecting unit both provided in the cellular phone.

Next, with reference to FIGS. 6A and 6B, the following description will describe a detecting method of the antenna retraction state by the antenna retraction detecting unit 38, and a detecting method of the flipper open/close state by the flipper open/close detecting circuit 39 both provided in the cellular phone 2.

As shown in FIG. 6A, the antenna unit 40 for the wireless telephone system is composed of a pole antenna 61 which is retractable in a direction 60 indicated by an arrow, and a spring switch 63 is provided at an antennas bottom portion 62 to detect the retraction state of the pole antenna 61. If the spring switch 63 is turned ON by the antenna's bottom portion 62, it means that the pole antenna 61 is contained in a main body. On the other hand, if the spring switch 63 is turned OFF, it means that the pole antenna 61 is pulled out from the main body. The antenna retraction detecting unit 38 detects the retraction state of the pole antenna 61 based on the ON/OFF state of the spring switch 63 in the above manner.

Also, as shown in FIG. 6B, when a flipper (covering member) 64 that covers the key manipulation unit 44 of the cellular phone 2 is attached to the main body of the cellular phone 2 so as to be allowed to open and close as necessary, a press button switch 65 that is switched ON when the flipper 64 is closed and OFF when the flipper 64 is opened is provided in the vicinity of the key manipulation unit 44. Consequently, it can be detected that the flipper 64 is closed when the press button switch 65 is switched ON and the flipper 64 is opened when the press button switch 65 is switched OFF. The flipper open/close detecting unit 39 detects the open/close state of the flipper 64 based on the ON/OFF state of the press button switch 65 in the above manner.

Next, the following description will describe an operation of the present system.

The explanation is given as to a job in the PC 1 and a job in the cellular phone 2 separately in a communication system allowing a data communication between the PC 1 and cellular phone 2 by a wireless communication in 2.45 GHz in the two following cases:

(A) when desired software installed in the PC 1 is handled on the cellular phone 2 by the key manipulation on the cellular phone 2; and (B) when desired software installed in the cellular phone 2 is handled on the PC 1 by the key manipulation on the PC 1.

(A) Handling PC 1's Software on Cellular Phone 2

Figure 7:
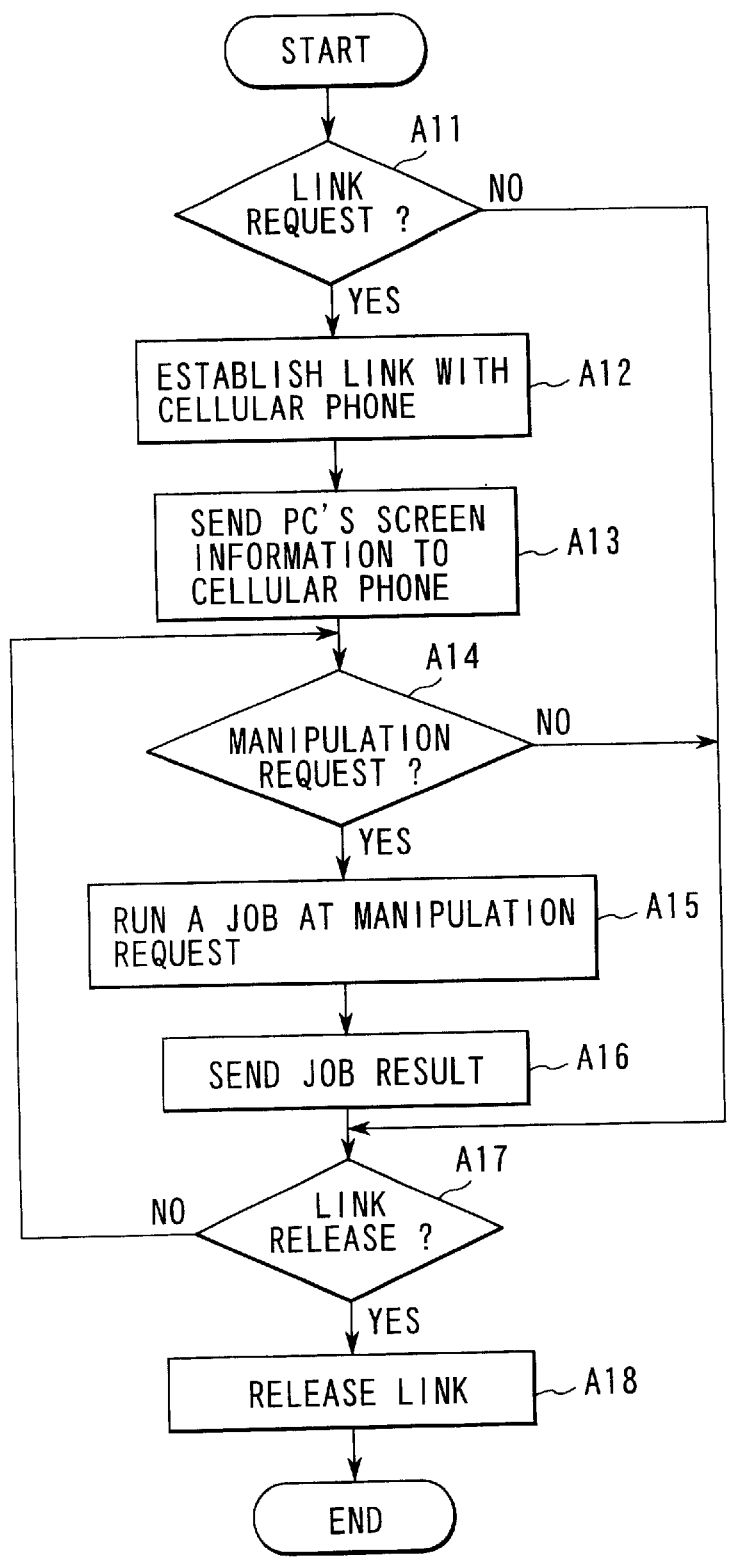
FIG. 7 is a flowchart detailing an operation of the PC when handling data on the PC's software on the cellular phone.
Figure 8:
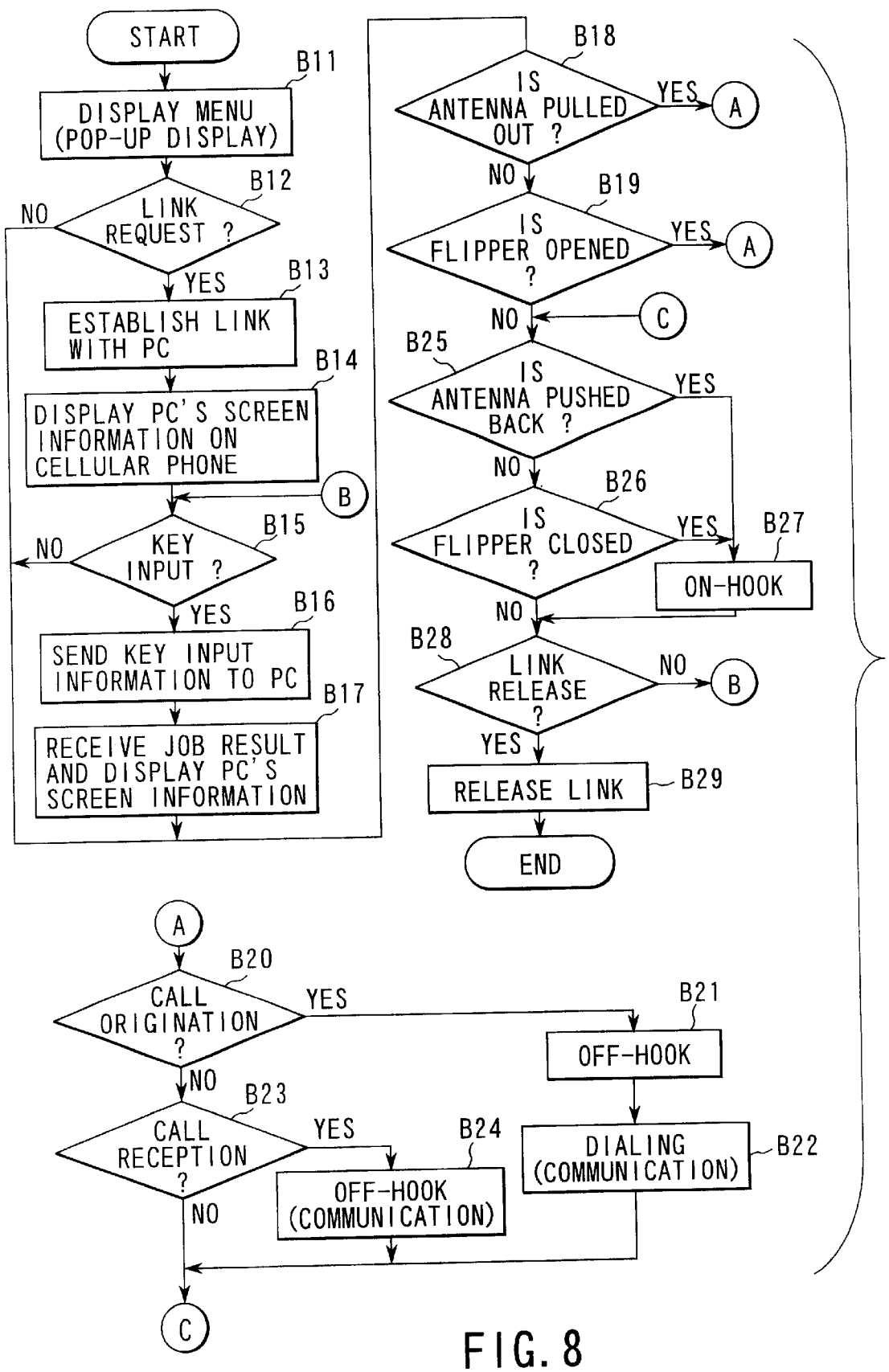
FIG. 8 is a flowchart detailing an operation of the cellular phone when handling data on the PC's software on the cellular phone.

In the first place, the following description will describe jobs when desired software installed in the PC 1 is handled on the cellular phone 2 by the key manipulation thereon with reference to FIGS. 7 and 8.

Job in PC 1

FIG. 7 is a flowchart detailing a job for software installed in the PC 1.

The PC 1 is in a link request waiting state, and monitors periodically whether a wireless link establish request has been issued from the cellular phone 2 or not (Step A11). If the link establish request has been issued (Yes in Step A11), the PC 1 confirms that the requesting party is the cellular phone 2 from the ID information contained in the link establish request, and runs a job (negotiation) to establish a link with the 2.45 GHz wireless communication device in the cellular phone 2 by controlling the baseband unit 10, so that a wireless link using a wireless communication in 2.45 GHz is established with the cellular phone 2 (Step A12).

When the link establish request has not been issued (No in Step A11), the flow skips to a sequence where whether a link release request has been issued or not is determined (Step A17).

When the wireless link is established with the cellular phone 2, the PC 1 sends screen data equivalent to a menu screen showing a list of all kinds of software (application software) installed therein to the cellular phone 2 via the wireless link. More specifically, the personal computer engine 15 controls the baseband unit 10 in the wireless communication module 7, so that screen data equivalent to a screen showing a list of all kinds of software is sent to the cellular phone 2 by a wireless radio wave (Step A13).

After the screen data is sent, the PC 1 determines whether a manipulation request in selecting specific software has been issued or not from the cellular phone 2 (Step A14). When the manipulation request has been issued from the cellular phone 2 (Yes in Step A14), the personal computer engine 15 in the PC 1 accepts the manipulation request as a command from the keyboard 21 of the PC main body, and runs the software at that command from the cellular phone 2 (Step A15). Then, the personal computer engine 15 sends the screen data as the job result (display data generated by starting the software) to the cellular phone 2 in real time via the wireless link (Step A16).

When the manipulation request has not been issued from the cellular phone 2 (No in Step A14), the flow skips to the sequence where whether a link release request has been issued or not is determined (Step A17).

Finally, the PC 1 determines whether a wireless link release request has been issued or not from the cellular phone 2 (Step A17). When the link release request has been issued (Yes in Step A17), the PC 1 runs a job to release the wireless link with the cellular phone 2 and ends the job (Step A18). When the link release request has not been issued (No in Step A17), the flow returns to the sequence where whether a manipulation request has been issued or not is determined (Step A14).

Job in Cellular Phone 2

FIG. 8 is a flowchart detailing a job for software installed in the cellular phone 2.

When a program of the present system is started on the cellular phone 2 by manipulating function keys provided in the key manipulation unit 44, for example, the menu screen is popped up on the LCD 43 as a specific screen of the present system (Step B11). The menu screen is the specific screen to enable the user to see the data sent from the PC 1, and includes a link button to establish a wireless link with the PC 1 and the like.

After the menu screen is displayed, whether a request to establish a wireless link with the PC 1 has been issued from the user or not is determined (Step B12). When the wireless link establish request has been issued (Yes in Step B12), the cellular phone 2 runs a job (negotiation) to establish a link with the 2.45 GHz wireless communication device in the PC 1 by controlling the baseband unit 33, so that a wireless link using a wireless communication in 2.45 GHz is established with the PC 1 (Step B13). In this case, the cellular phone 2 sends a link request signal including its own ID information to the PC 1.

When the link establish request has not been issued (No in Step B12), the flow skips to a sequence where whether the antenna is pulled out or not is determined (Step B18).

When the wireless link is established with the PC 1 upon receipt of a response signal for the link request signal from the PC 1, the cellular phone 2 receives screen data (menu screen showing a list of all kinds of software installed in the PC 1) via the wireless link, which is displayed on the LCD 43 of the cellular phone 2. More specifically, the cellular phone engine 36 controls the baseband unit 33 in the wireless communication module 30, so that screen data of the PC 1 is received by a wireless radio wave to be displayed on the LCD 43 (Step B14).

The screen of the PC 1 displayed on the cellular phone 2 shows a list of all kinds of software installed in the PC 1, and the user can select desired software by manipulating the key manipulation unit 44 of the cellular phone 2.

The cellular phone 2 determines whether there has been any key manipulation input to select software from the screen of the PC 1 (Step B15). When the key manipulation has been inputted (Yes in Step B15), the cellular phone 2 sends the key input information to the PC 1 as the manipulation request to the PC 1 (Step B16). When screen data corresponding to the selected software in response to the manipulation request (display data generated by starting the selected software) is sent from the PC 1 via the wireless link, the cellular phone 2 receives the screen data and displays the same on the LCD 43 in real time (Step B17).

When the manipulation request has not been issued (No in Step B15), the flow skips to the sequence where whether the antenna is pulled out or not is determined (Step B18).

Then, the antenna retraction state of the antenna unit 40 and the open/close state of the flipper 64 shown in FIG. 6B are detected by the antenna retraction detecting unit 38 and flipper open/close detecting unit 39, respectively (Step B18, Step B19).

When the antenna retraction detecting unit 38 detects that the pole antenna 61 used as the antenna unit 40 is pulled out from the main body (Yes in Step B18), or the flipper open/close detecting unit 39 detects that the closed flipper 64 is opened (Yes in B19), the cellular phone 2 determines whether the user has issued a call origination request or not (Step B20). If the user has issued a call origination request (Yes in Step B20), the cellular phone 2 performs an off-hook operation (Step B21), and after originating a call based on a dial number inputted by the user, the cellular phone 2 starts a communication (Step B22). When the cellular phone 2 receives an incoming call request from the cellular phone station 3 (Yes in Step B23), the cellular phone 2 performs the off-hook operation, and receives a call from the calling party to start a communication (Step B24).

On the other hand, when the antenna retraction detecting unit 38 detects that the pulled-out antenna 61 is pushed back in the main body (Yes in Step B25), or the flipper open/close detecting unit 39 detects that the opened flipper 64 is closed (Yes in Step B26), the cellular phone 2 performs the on-hook operation and terminates the communication (Step B27).

Finally, the cellular phone 2 determines whether the user has issued a wireless link release request or not (Step B28). If the user has issued the wireless link release request (Yes in Step B28), the cellular phone 2 runs a job to release the wireless link with the PC 1 and ends the job (Step B29). If the user has not issued the wireless link release request (No in Step B28), the flow returns to the sequence where whether the key manipulation request has been issued or not is determined (Step B15).

The above explanation described an example case where the wireless link between the cellular phone 2 and PC 1 is established when a link request is issued from the cellular phone 2 to the PC 1 by the user's manipulation on the cellular phone 2. However, the wireless link between the cellular phone 2 and PC 1 can be established when a link request is issued from the PC 1 to the cellular phone 2 by the user's manipulation on the PC 1.

As has been discussed, software on the PC 1 can be started by a remote key manipulation on the PC 1 from the cellular phone 2, and corresponding data can be displayed on the display screen of the cellular phone 2. In this case, because the PC 1 and cellular phone 2 are connected via a wireless communication, the PC 1 and cellular phone 2 can communicate in a stable manner even an obstacle stands in the way.

Figure 9:
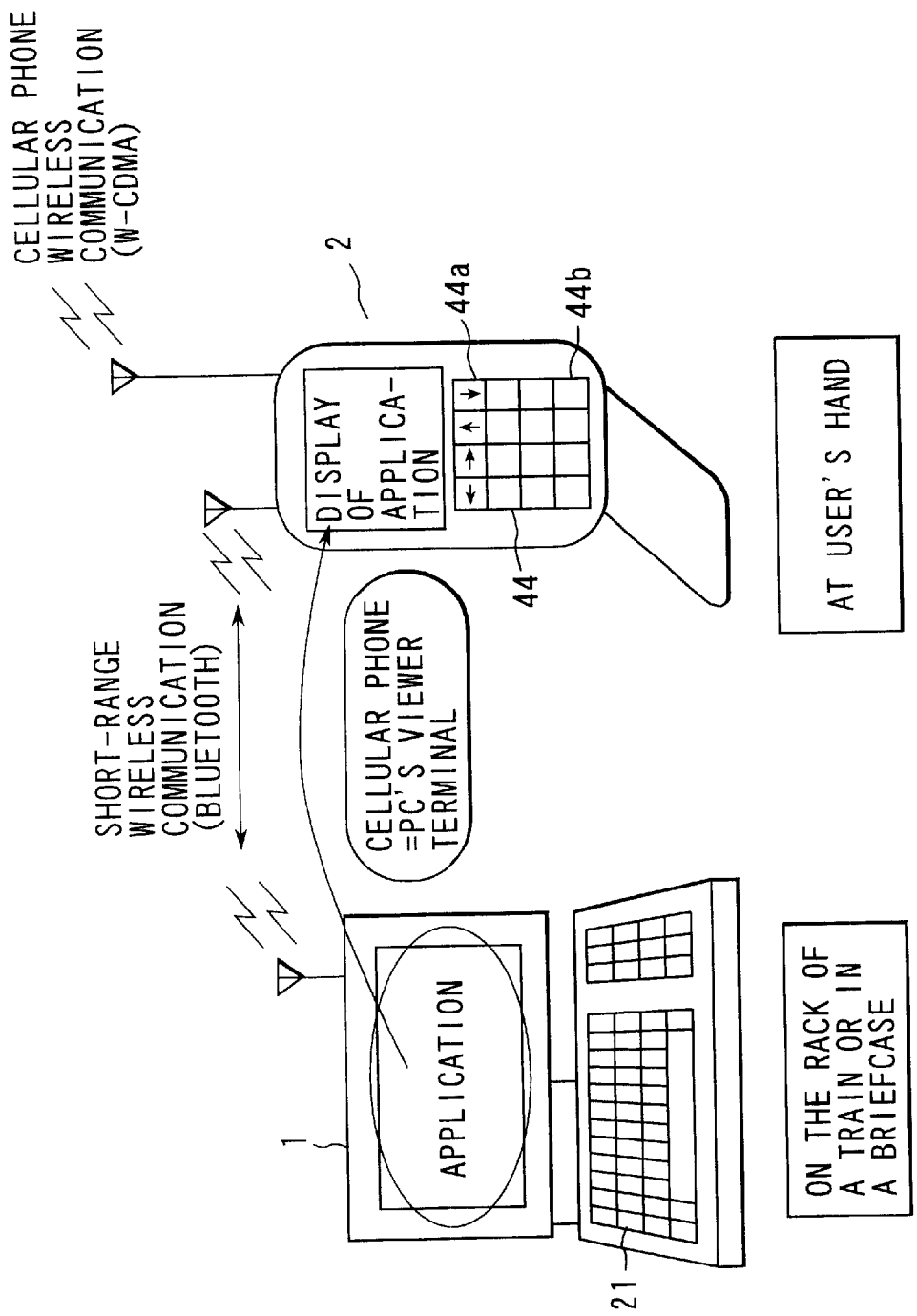
FIG. 9 is a view explaining a specific scene when handling data on the PC's software on the cellular phone.

Thus, as shown in FIG. 9, even when the PC 1 is placed on the rack in a commuter train or in the user's briefcase, the user can selectively retrieve data on desired software installed in the PC 1 by manipulating the cellular phone 2 at hand. Desired software is selected from the PC 1's screen displayed on the cellular phone 2 by manipulating arrow keys 44a or function keys 44b formed in the key manipulation unit 44. The PC 1 accepts the key manipulation on the cellular phone 2 as a command from its own keyboard 21, and sends data on the specified software to the cellular phone 2. Consequently, the user can see data on the desired software installed in the PC 1 by using the cellular phone 2 as a viewer of the PC 1.

The size of the screen of the cellular phone 2 is generally smaller than that of the PC 1. Therefore, when data is sent from the PC 1 to the cellular phone 2, it is preferable to process the data by changing the character font or removing unnecessary data in accordance with the size of the screen of the cellular phone 2.

In addition, if the data is displayed in a size larger than the size of the display screen of the cellular phone 2, the user scrolls the screen vertically or horizontally by manipulating the arrow keys 44a. The arrow keys 44a and function keys 44b are formed in the key manipulation unit 44 of the cellular phone 2 as standard accessories. Thus, it is not necessary to provide additional keys for the present system.

A specific scene where the cellular phone 2 is used as the viewer of the PC 1 is, for example, a case where the user confirms schedule data registered in a scheduler (schedule managing function) in the PC 1 on the cellular phone 2. In other words, as discussed above, even when the PC 1 is placed on the rack in a train or the user's briefcase and not at hand, the user can access the PC 1 to start the scheduler from the cellular phone 2 via the wireless link, so that the data in the scheduler can be displayed on the screen of the cellular phone 2, thereby enabling the user to confirm the data. It should be appreciated that, in the above case, the PC 1 is at least in the stand-by state and ready to accept a link request from the cellular phone 2.

When originating a call from the cellular phone 2, the user can display a desired telephone number registered in the address function of the PC 1 on the screen of the cellular phone 2. After the user inputs the telephone number, as has been explained with reference to FIG. 6B, a call is originated automatically based on the input telephone number by merely pulling out the antenna 61 or opening the flipper 64 without any calling manipulation.

In case that the cellular phone 2 is provided with a text message function, there is a problem that it is tedious to make message data by inputting characters one by one by manipulating the key manipulation unit 44 of the cellular phone 2. However, the user can make message data on the word processing software installed in the PC 1 and send the messaged data to the cellular phone 2. In this case, message data can be made without tedious key manipulation on the cellular phone 2, and the user can send a message easily.

(B) Handling Data in Cellular Phone 2 on PC 1

Figure 10:
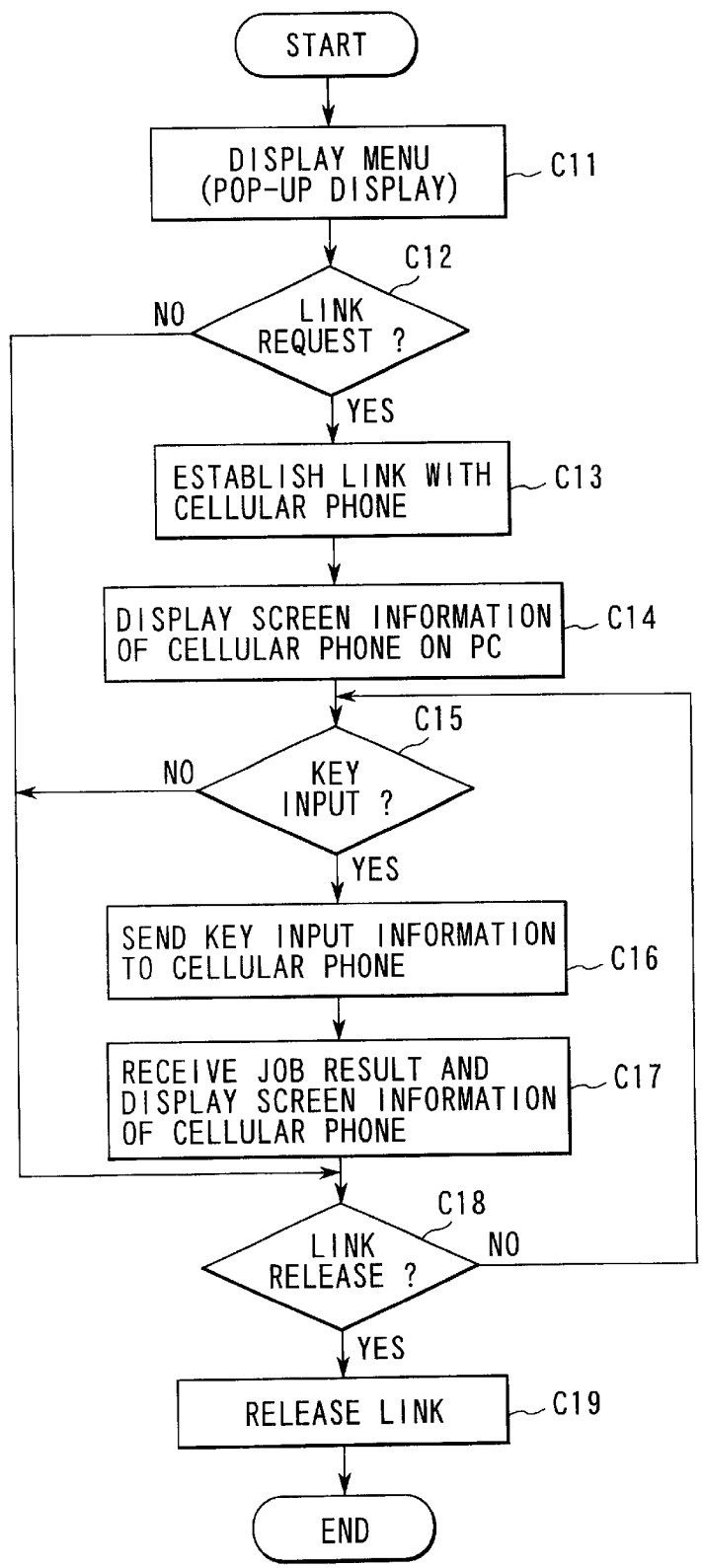
FIG. 10 is a flowchart detailing an operation of the PC when handling data on the cellular phone's software on the PC.
Figure 11:
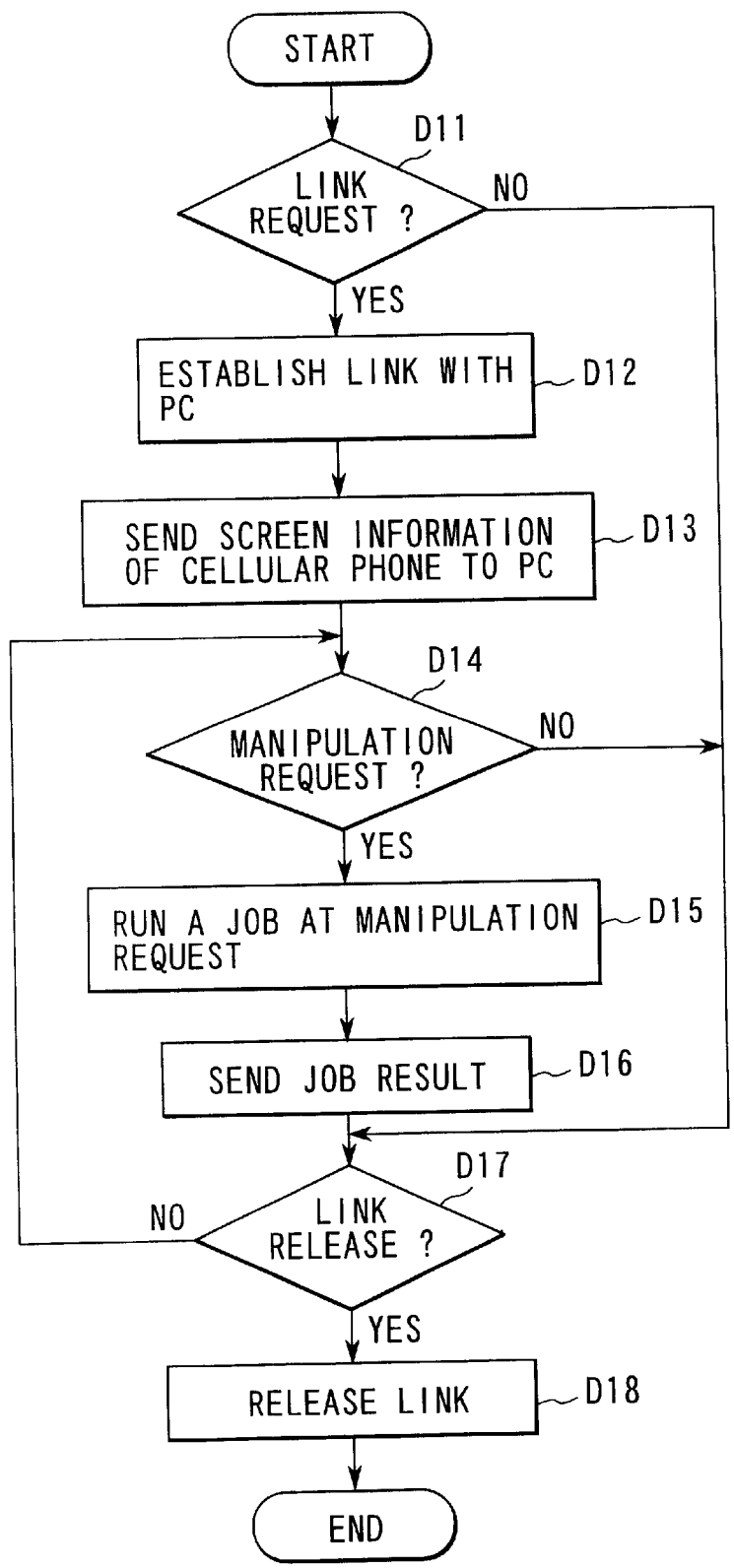
FIG. 11 is a flowchart detailing an operation of the cellular phone when handling data on the cellular phone's software on the PC.

Next, the following description will describe jobs when handling software installed in the cellular phone 2 on the PC 1 by a key manipulation on the PC 1 with reference to FIGS. 10 and 11.

Jobs in PC 1

FIG. 10 is a flowchart detailing a job for software installed in the PC 1.

When the program of the present system is started on the PC 1 by selecting a specific icon on the screen or manipulating a specific key on the keyboard 21, a menu screen is popped up on the LCD 20 as a specific screen of the present system (Step C11). This menu screen is a specific screen to enable the user to see data sent from the cellular phone 2, and includes a link button to establish a wireless link with the cellular phone 2 and the like.

After the menu screen is displayed, the PC 1 determines whether the user has issued a request to establish a wireless link with the cellular phone 2 (Step C12). If the user has issued the request to establish a wireless link (Yes in Step C12), in order to establish a wireless link with the cellular phone 2 via a wireless communication in 2.45 GHz, the PC 1 runs a job (negotiation) to establish a link with the 2.45 GHz wireless communication device in the cellular phone 2 by controlling the baseband unit 10 (Step C13). In this case, the PC 1 sends a link request signal including its own ID information to the cellular phone 2.

When the user has not issued the link establish request (No in Step C12), the flow skips to a sequence where whether a link release request has been issued or not is determined (Step C18).

When the wireless link is established with the cellular phone 2 upon receipt of a response signal from the cellular phone 2 to the link request signal, the PC 1 receives screen data (menu screen showing a list of all kind of software installed in the cellular phone 2) via the wireless link, and displays the same on its own LCD 20. More specifically, the personal computer engine 15 controls the baseband unit 10 in the wireless communication module 7, so that screen data of the cellular phone 2 is received by a wireless radio wave to be displayed on the LCD 20 (Step C14).

The cellular phone's screen displayed on the PC 1 shows a list of all kinds of software installed in the cellular phone 2, so that the user can select desired software by manipulating the keyboard 21 of the PC 1.

The PC 1 determines whether there has been a key manipulation input from the user to select software on the cellular phone's screen (Step C15). If there has been a key manipulation input (Yes in Step C15), the PC 1 sends the key input information to the cellular phone 2 as a manipulation request (Step C16). When screen data corresponding to the selected software (display data generated by starting the selected software) is sent from the cellular phone 2 in response to the manipulation request via the wireless link, the PC 1 displays the received data on the LCD 20 in real time (Step C17).

When the manipulation request has not been issued (No in Step C15), the flow skips to the sequence where whether a link release request has been issued or not is determined (Step C18).

Finally, the PC 1 determines whether the user has issued a wireless link request or not (Step C18). If the user has issued the wireless link request (Yes in Step C18), the PC 1 runs a job to release the wireless link with the cellular phone 2, and ends the job (Step C19). If the link release request has not been issued (No in Step C18), the flow returns to the sequence where whether a key manipulation request has been issued or not is determined (Step C15).

Job in Cellular Phone 2

FIG. 11 is a flowchart detailing a job for software installed in the cellular phone 2.

The cellular phone 2 is in the waiting state for a link request, and monitors periodically whether the PC 1 has issued a wireless link establish request (Step D11). When the link request has been issued (Yes in Step D11), the cellular phone 2 confirms that the requesting party is the PC 1 from the ID information contained in the link establish request, and in order to establish a wireless link via a wireless communication in 2.45 GHz with the PC 1, the cellular phone 2 runs a job (negotiation) to establish a link with the 2.45 GHz wireless communication device in the PC 1 by controlling the baseband unit 33 (Step D12).

When the link establish request has not been issued (No in Step D11), the flow skips to a sequence where whether a link release request has been issued or not is determined (Step D17).

After the wireless link is established with the PC 1, the cellular phone 2 sends screen data equivalent to the menu screen showing a list of all kinds of software (application software) installed therein to the PC 1 via the wireless link. More specifically, the cellular phone engine 36 controls the baseband unit 33 in the wireless module 30, so that the screen data equivalent to the menu screen showing the list of all kinds of software installed in the cellular phone 2 is sent to the PC 1 by a wireless radio wave (Step D13).

After the screen data transmission, the cellular phone 2 determines whether the PC 1 has issued a manipulation request to select software (Step D14). If the PC 1 has issued a manipulation request (Yes in Step D14), the cellular phone engine 36 of the cellular phone 2 accepts the manipulation request as a command from the key manipulation unit 44 of the cellular phone main body, and runs the selected software at that command from the PC 1 (Step D15), and sends the screen data as the job result (display data generated by starting the software) to the PC 1 in real time via the wireless link (Step D16).

When the PC 1 has not issued the manipulation request (No in Step D14), the flow skips to the sequence where whether a link release request has been issued or not is determined (Step D17).

Finally, the cellular phone 2 determines whether the PC 1 has issued a wireless link release request or not (Step D17). If the PC 1 has issued the wireless link release request (Yes in Step D17), the cellular phone 2 runs a job to release the wireless link with the PC 1, and ends the job (Step D18). When the link release request has not been issued (No in Step D17), the flow returns to the sequence where whether a manipulation request has been inputted or not is determined (Step D14).

The foregoing explained a case where the wireless link is established between the PC 1 and cellular phone 2 when a link request is issued from the PC 1 to the cellular phone 2 by the user's manipulation on the PC 1. However, the wireless link can be established between the PC 1 and cellular phone 2 when a link request is issued from the cellular phone 2 to the PC 1 by the user's manipulation on the cellular phone 2.

As has been discussed, the software on the cellular phone 2 can be started by a remote key manipulation from the PC 1, and the data thereof can be displayed on the display screen of the PC 1. In this case, because the PC 1 and cellular phone 2 are connected via the wireless communication, the PC 1 and cellular phone 2 can communicate in a stable manner even if an obstacle stands in the way.

Figure 12:
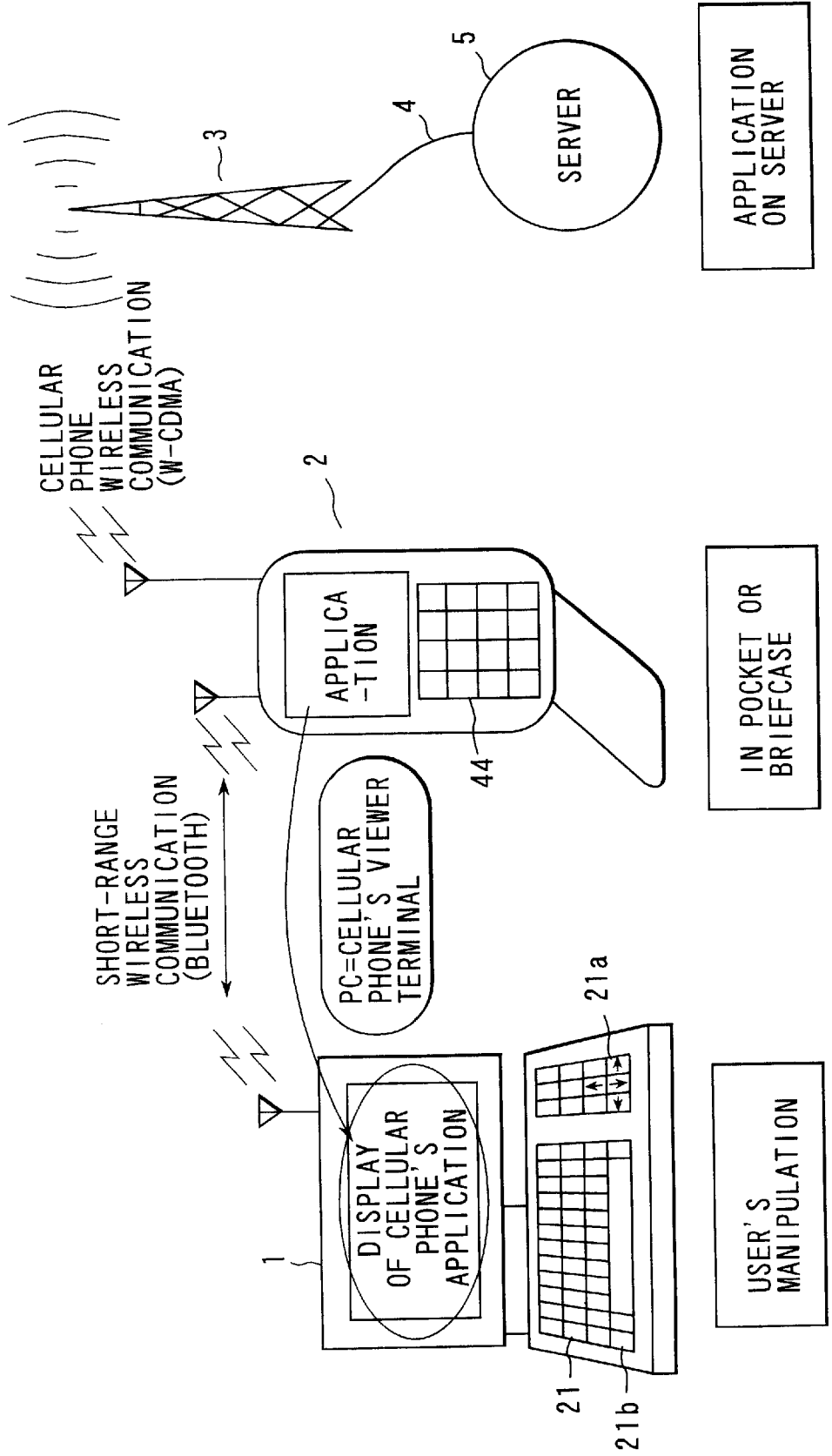
FIG. 12 is a view explaining a specific scene when handling data on the cellular phone's software on the PC.

Thus, as shown in FIG. 12, even when the cellular phone 2 is put in a pocket or in the user's briefcase, the data on arbitrarily selected software installed in the cellular phone 2 can be retrieved by the nearby PC 1. The user can select desired software from the cellular phone's screen displayed on the PC 1 by manipulating arrow keys 21a and function keys 21b formed in the keyboard 21, for example. The cellular phone 2 accepts the key manipulation on the PC 1 as a command from its own key manipulation unit 44, and sends data of the specified software to the PC 1. Consequently, the user can see the data on the software installed in the cellular phone 2 by using the PC 1 as the viewer of the cellular phone 2. In other words, the user can see the data on the software stored in the cellular phone 2 by using the PC 1 which is more easy to manipulate.

An example scene to use the PC 1 as the viewer of the cellular phone 2 is a case where the user confirms data of an e-mail received by the cellular phone 2 on the PC 1. In other words, as has been discussed, even when the cellular phone 2 is put in a pocket or the user's briefcase and not at hand, the user can access the cellular phone 2 from the PC 1 via the wireless communication, starts an e-mail function of the cellular phone 2, and confirms the mail data obtained by the e-mail function by displaying the same on the screen of the PC 1. In this case, it should be appreciated that the cellular phone 2 is turned ON and ready to start a communication with the PC 1 or cellular phone station 3.

Besides the foregoing, in case that service information of various kinds provided from the server 5 can be reviewed on the cellular phone 2, the service information can be sent to the PC 1, so that the user can see the same on the screen of the PC 1.

In addition, the user can receive electric field intensity information or battery information of the cellular phone 2 by manipulating the PC 1 to send a corresponding command to the cellular phone 2. Consequently, the user can check on the PC 1 whether the electric field intensity in the cellular phone 2 for a wireless link with the local cellular phone station 3 is sufficiently strong to receive data and the charging state of the battery is sufficiently high even when the cellular phone 2 is not at hand, and as needed, user can manipulate the PC 1 to send data to a public line via the cellular phone 2 when the electric field intensity is sufficiently strong, or send a command for turning OFF the power source to the cellular phone 2 when save power consumption is needed.

The present embodiment explained a data communication between two devices, the cellular phone and PC. However, data can be transmitted/received among more than two devices to display data on desired software installed in another device on its own display screen, if the device is provided with a similar wireless communication function (a wireless LAN or Bluetooth System in 2.45 GHz).

As has been described in detail, according to the present invention, a cellular phone and a PC are connected to each other via a wireless communication, so that the user can selectively start software installed in the PC by manipulating the cellular phone to display the corresponding data on the screen of the cellular phone, or selectively start the software installed in the cellular phone by manipulating the PC to display the corresponding data on the screen of the PC.

Consequently, even when the PC is placed on the rack in a train, the user can access the PC from the cellular phone at hand to see the data in the PC. Conversely, the user can see the data in the cellular phone on the PC which is more easy to manipulate.

In addition, because the cellular phone is arranged in such a manner that a call is originated based on the antenna retraction state or the open/close state of the covering member, when manipulating the PC from the cellular phone, a call is originated by merely pulling out the antenna or opening the covering member, and the communication can be terminated by merely pushing back the antenna or closing the covering member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication device comprising:

means for establishing a wireless link for wireless communication with an external device;

means for sending to said external device via said wireless link a signal to request to send menu display data showing a plurality of kinds of software installed in said external device;

means for receiving from said external device via said wireless link said menu display data; and means for displaying on a screen said menu display data received.

2. The mobile communication device according to claim 1, further comprising:

means for receiving from said external device via said wireless link a signal to start software installed in said mobile communication device; and means for sending to said external device via said wireless link display data generated by said software installed in said mobile communication device.

3. The mobile communication device according to claim 2, further comprising:

means for receiving from said external device via said wireless link a signal to request to transmit menu display data showing a plurality of kinds of software installed in said mobile communication device; and means for sending to said external device via said wireless link said menu display data.

4. The mobile communication device according to claim 1, wherein said mobile communication device is a cellular phone.

5. The mobile communication device according to claim 4, wherein said cellular phone includes:

a retractable antenna; and means for originating a call when said antenna is pulled out, and terminating a communication when said antenna is pushed back.

6. The mobile communication device according to claim 4, wherein said cellular phone includes:

a covering member which is closable to cover at least a portion of said cellular phone; and means for originating a call when said covering member is opened, and terminating a communication when said covering member is closed.

7. The mobile communication device according to claim 1, wherein said establishing means establishes the wireless link by a radio wave in a frequency bandwidth different from a frequency bandwidth of a radio wave for a wireless communication used in making a connection to a public line.

8. A portable information processing device comprising:

means for establishing a wireless link for wireless communication with a mobile communication device;

means for sending to said mobile communication device via said wireless link a signal to request to send menu display data showing a plurality of kinds of software installed in said mobile communication device;

means for receiving from said mobile communication device via said wireless link said menu display data; and means for displaying on a screen said menu display data received.

9. The portable information processing device according to claim 8, further comprising:

means for receiving from said mobile communication device via said wireless link a signal to start software installed in said portable information device; and means for sending to said mobile communication device via said wireless link display data generated by said software installed in said portable information device.

10. The portable information processing device according to claim 9, further comprising:

means for receiving from said mobile communication device via said wireless link a signal to request to send menu display data showing a plurality of kinds of software installed in said portable information processing device; and means for sending to said mobile communication device via said wireless link said menu display data.

11. The portable information processing device according to claim 8, wherein said establishing means establishes the wireless link by a radio wave in a frequency bandwidth different from a frequency bandwidth of a radio wave for a wireless communication used in making a connection to a public line.

12. A communication system having a mobile communication device and a portable information processing device comprising:

means, provided in said mobile communication device and portable information processing device, for establishing a wireless link for wireless communication between said mobile communication device and portable information processing device;

means, provided in said mobile communication device, for sending to said portable information processing device via said wireless link a first signal to request to send menu display data showing a plurality of kinds of software installed in said portable information processing device;

means, provided in said portable information processing device, for sending to said mobile communication device via said wireless link said menu display data in response to said first signal; and means, provided in said mobile communication device, for displaying said menu display data sent from said portable information processing device on a screen of said mobile communication device.

13. The system according to claim 12, further comprising:

means, provided in said portable information processing device, for sending to said mobile communication device via said wireless link a second signal to start software stored in said mobile communication device;

means, provided in said mobile communication device, for sending display data generated by software installed in said mobile communication device to said portable information processing device via said wireless link in response to said second signal; and means, provided in said portable information processing device, for displaying said display data sent from said mobile communication device on a screen of said portable information processing device.

14. A data communication method for use in a communication system having a mobile communication device and a portable information processing device, comprising the steps of:

establishing a wireless link for wireless communication between said mobile communication device and portable information processing device;

sending to said portable information processing device from said mobile communication device via said wireless link a first signal to request to send menu display data showing a plurality of kinds of software installed in said portable information processing device;

sending said menu display data to said mobile communication device from said portable information processing device via said wireless link in response to said first signal; and displaying said menu display data sent from said portable information processing device to said mobile communication device on a screen of said mobile communication device.

15. The method according to claim 14, further comprising the steps of:

sending to said mobile communication device from said portable information processing device via said wireless link a second signal to start software installed in said mobile communication device;

sending display data generated by said software installed in said mobile communication device to said portable information processing device from said mobile communication device via said wireless link in response to said second signal; and displaying said display data sent from said mobile communication device to said portable information processing device on a screen of said portable information processing device.

16. A portable information processing device comprising:

means for setting a first wireless link with a cellular phone which is connectable to a public line via a second wireless link;

means for, via said first wireless link, sending a command to said cellular phone; and means for, via said first wireless link, receiving data corresponding to the command from said cellular phone, said data including electric field intensity information for said second wireless link.

17. The portable information processing device according to claim 16, further comprising:

means for displaying the battery information; and means for sending data to said public line via said first wireless link and the cellular phone.

18. A mobile communication device comprising:

means for establishing a wireless link for communication with an external device;

means for sending to said external device via said wireless link a signal to start software installed in said external device;

means for receiving from said external device via said wireless link display data generated by said software installed in said external device;

means for receiving from said external device via said wireless link a signal to start software installed in said mobile communication device;

means for sending to said external device via said wireless link display data generated by said software installed in said mobile communication device;

means for receiving from said external device via said wireless link a signal to request to transmit menu display data showing a plurality of kinds of software installed in said mobile communication device; and means for displaying on a screen said menu display data received.

19. A cellular phone comprising:

a retractable antenna;

means for originating a call when said antenna is pulled out, and terminating a communication when said antenna is pushed back;

means for establishing a wireless link for communication with an external device;

means for sending to said external device via said wireless link a signal to start software installed in said external device;

means for receiving from said external device via said wireless link display data generated by software installed in said external device; and means for displaying on a screen said display data received.

20. A cellular phone comprising:

a covering member which is closable to cover a manipulation unit of said cellular phone;

means for originating a call when said covering member is opened, and terminating a communication when said covering member is closed;

means for establishing a wireless link for communication with an external device;

means for sending to said external device via said wireless link a signal to start software installed in said external device;

means for receiving from said external device via said wireless link display data generated by said software; and means for displaying on a screen said display data received.

21. A portable information processing device comprising:

means for establishing a wireless link for communication with a mobile communication device;

means for sending to said mobile communication device via said wireless link a signal to start software installed in said mobile communication device;

means for receiving from said mobile communication device via said wireless link display data generated by said software installed in said mobile communication device;

means for receiving from said mobile communication device via said wireless link a signal to start software installed in said portable information device;

means for sending to said mobile communication device via said wireless link display data generated by said software installed in said portable information device;

means for receiving from said mobile communication device via said wireless link a signal to request to send menu display data showing a plurality of kinds of software installed in said portable information device;

means for sending to said mobile communication device via said wireless link said menu display data; and means for displaying on a screen said menu display data received.

* * * * *